(12) United States Patent
Mei et al.

(10) Patent No.: US 8,115,801 B2
(45) Date of Patent: Feb. 14, 2012

(54) METHOD OF AUTOMATIC PHOTOGRAPHS STITCHING

(75) Inventors: Qipeng Mei, Hangzhou (CN); Yushan Huang, Hangzhou (CN); Kuaixuan Mao, Fremont, CA (US); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 846 days.

(21) Appl. No.: 12/153,191

(22) Filed: May 15, 2008

(65) Prior Publication Data

US 2009/0284582 A1    Nov. 19, 2009

(51) Int. Cl.
*H04N 7/00* (2006.01)

(52) U.S. Cl. .......................................... 348/36
(58) Field of Classification Search ............... 348/36–39
See application file for complete search history.

(56) References Cited

U.S. PATENT DOCUMENTS

| | | | |
|---|---|---|---|
| 5,657,073 A * | 8/1997 | Henley | 348/38 |
| 7,436,438 B2 * | 10/2008 | Sim et al. | 348/218.1 |
| 7,440,593 B1 * | 10/2008 | Steinberg et al. | 382/118 |
| 2005/0206743 A1 * | 9/2005 | Sim et al. | 348/218.1 |
| 2007/0279494 A1 * | 12/2007 | Aman et al. | 348/169 |
| 2008/0111831 A1 * | 5/2008 | Son et al. | 345/629 |
| 2008/0180550 A1 * | 7/2008 | Gulliksson | 348/231.99 |
| 2010/0165075 A1 * | 7/2010 | Chou et al. | 348/36 |
| 2010/0194852 A1 * | 8/2010 | Tseng et al. | 348/36 |

\* cited by examiner

*Primary Examiner* — Faruk Hamza
(74) *Attorney, Agent, or Firm* — Bacon & Thomas, PLLC

(57) ABSTRACT

A method of automatic photographs stitching in a photograph capturing electronic apparatus by capturing a photograph; on a viewfinder or display screen of said photograph capturing electronic apparatus, displaying at least one four-way guiding arrow for advising user the direction to move the photograph capturing electronic apparatus for capturing the next photograph which is suitable for stitching, the next suitable photograph having at a predetermined region, an area overlapped and aligned to the captured photograph with the overlapped and aligned area reaching a predetermined proportion; capturing the next suitable photograph; and stitching the consecutively captured photographs into a panoramic photograph.

4 Claims, 5 Drawing Sheets

METHOD OF AUTOMATIC PHOTOGRAPHS STITCHING

FIELD OF THE INVENTION

The present invention relates to a method of automatic photographs stitching. More precisely, the present invention relates to a method applied to a photograph capturing electronic apparatus for determining whether the current preview image is suitable for stitching by comparing overlapped area in the current preview image and a previously captured photograph.

BACKGROUND OF THE INVENTION

With the quantum leap of digital photographic technology in recent years, new generations of electronic apparatus (e.g. digital cameras, digital camcorders, notebook computers and mobile phones) equipped with digital capturing devices (e.g. CCD and CMOS) continuously roll out to the market. They are not only better in quality and more compact in size but also cheaper in price from day to day, pushing themselves toward the ranks of popular commodities. Many digital photograph capturing electronic apparatus are already capable of stitching continuously captured photographs. However, the quality of the stitched photograph still solely determined by the operational experience and handling skill of the user. As a result, it is a tall task for a novice in photography to capture photographs and stitch them into a satisfactory panoramic photograph. Consequently, development of a method of automatic photographs stitching that satisfies essential needs of most consumers, compensates the lack of skill and experience in photographs stitching and effectively saves the procedure and time in capturing and adjusting consecutively taken photographs while rendering admirable resultant panoramic photographs has become an imperative goal of all photograph capturing electronic apparatus designers and manufacturers.

Panoramic stitching function of conventional digital photograph capturing apparatus mainly relies on a series of consecutively captured photographs which are taken with requisite overlapped areas among them, and then said apparatus stitches said consecutively captured photographs into one panoramic picture. Refer to FIG. 1. Usually when the panoramic stitching mode is turned on by a user, a photograph 10 is first captured by a photograph capturing electronic apparatus. Said photograph capturing electronic apparatus then displays a virtual image neighboring and locating at about 20% to the left or right (depending on the photo-taking order set in said panoramic stitching mode) of said photograph 10 on its view finder or LCD screen as a reference image for the user to align at in capturing the next photograph 11. When the user discovers the left edge or right edge of next photograph 11 is not aligned with the left edge or right edge of said reference image, he/she must manually move said photograph capturing electronic apparatus until said photograph capturing electronic apparatus is adjusted to a position where the left or right edge of said next photograph 11 completely aligns and matches the left edge or right edge of said reference photograph. The user may now command said photograph capturing electronic apparatus to capture the next photograph 11 with the aid of a user interface provided by said electronic apparatus and have said electronic apparatus stitch said photographs 10 and 11. In this way, photographs 10, 11, 12 and 13 can be serially and consecutively captured and then stitched into panoramic photograph 20 as shown in FIG. 2.

From the above-mentioned, we learned that due to lack of photographs stitching ability and experience, most users fumble in said conventional panoramic stitching mode and usually wind up with an inferior panorama. In addition, many non-proficient users will need to spend huge amount of time in adjusting the position of photograph capturing electronic apparatus before a panoramic photograph can be achieve. Consequently, despite that panoramic feature is commonly equipped on photograph capturing electronic apparatus, it is rarely used by a user.

SUMMARY OF THE INVENTION

After considerable research and experimentation, a method of automatic photographs stitching according to the present invention has been developed so as to overcome the drawbacks such as inefficiency and inaccuracy associated with conventional panoramic stitching mode. Said method simplifies and makes the photograph capturing procedure more user friendly and thus dramatically increasing efficiency and accuracy of photographs stitching.

It is an object of the present invention to provide a method of automatic photographs stitching in a photograph capturing electronic apparatus where after said photograph capturing electronic apparatus has captured a photograph, said photograph capturing electronic apparatus displays on a viewfinder or display screen at least one four-way guiding arrow and an indicator (e.g. an indicating frame or indicating light). Said four-way arrow is for advising user the direction to move said photograph capturing electronic apparatus for capturing the next photograph (e.g. the second, third, fourth . . . photographs) which is suitable for stitching and said indicator is for indicating that photograph capturing electronic apparatus is at an appropriate position for capturing the next photograph for stitching and recommending the current preview image on said viewfinder or display screen being captured as the next suitable photograph. Therefore, a user can easily operate said photograph capturing electronic apparatus to capture a series of consecutive photographs and have said photograph capturing electronic apparatus automatically stitch said consecutive photographs into a prefect panoramic shot.

BRIEF DESCRIPTION OF THE DRAWINGS

The features, objects and advantages of the invention will become more apparent from the detailed description set forth below when taken in conjunction with the drawings in which like references characters identify correspondingly throughout, and wherein.

DETAILED DESCRIPTION OF THE PREFERRED EMBODIMENTS

Figure 1:
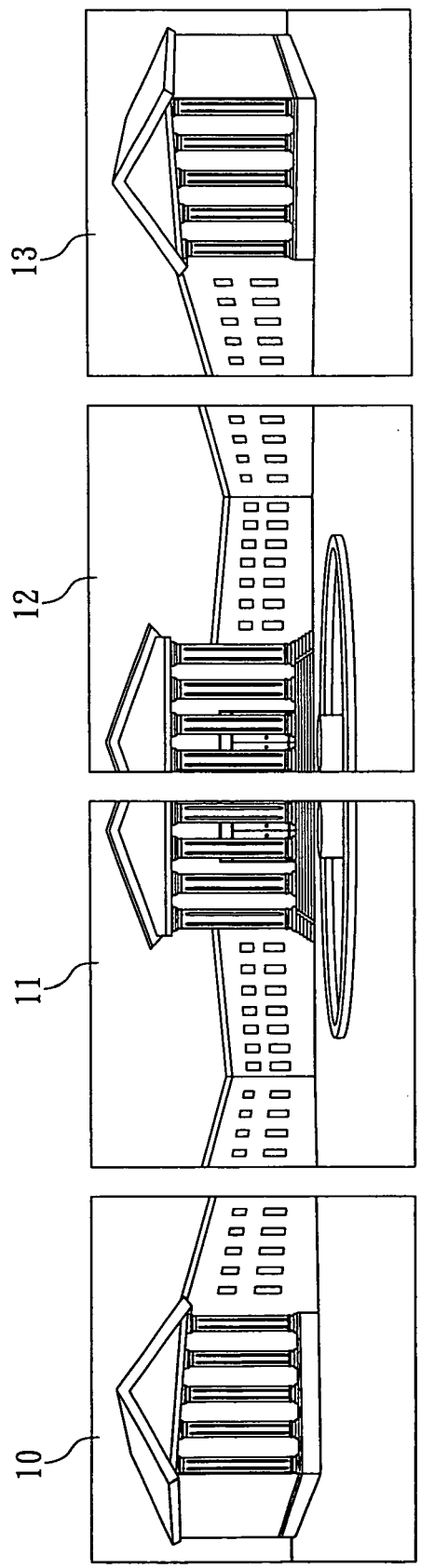
FIG. 1 is a representative diagram showing a series of consecutive photographs captured by a conventional photograph capturing electronic apparatus.
Figure 2:
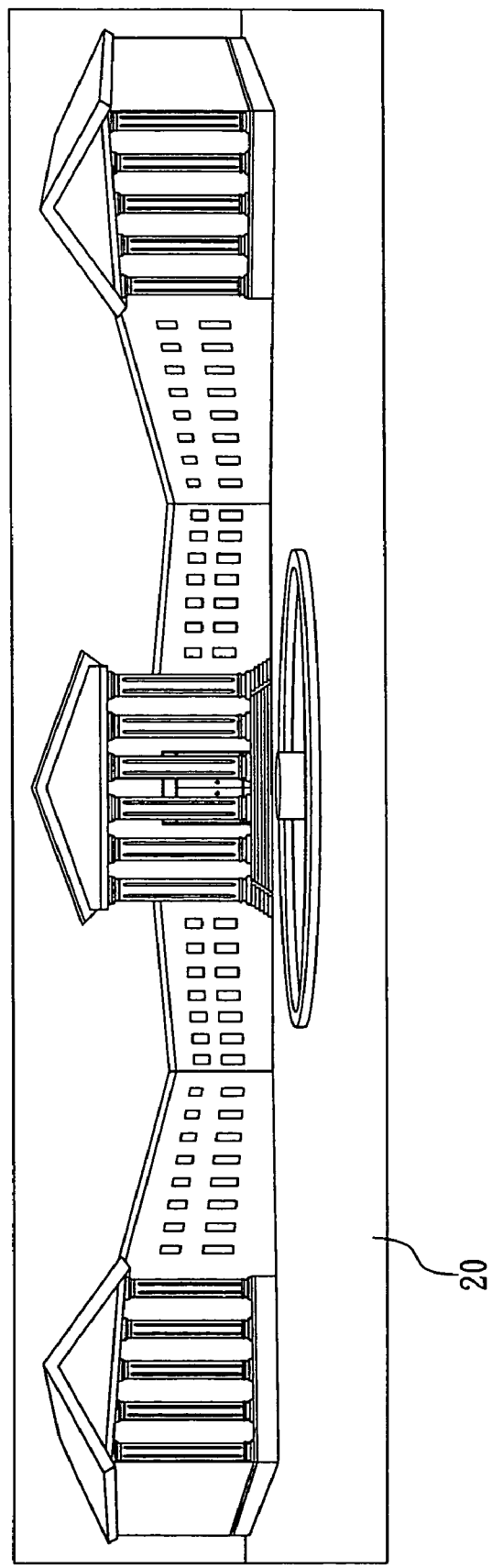
FIG. 2 shows a panoramic photograph from stitching said series of consecutive photographs in FIG. 1 by utilizing a panoramic stitching mode of a conventional photograph capturing electronic apparatus.
Figure 3:
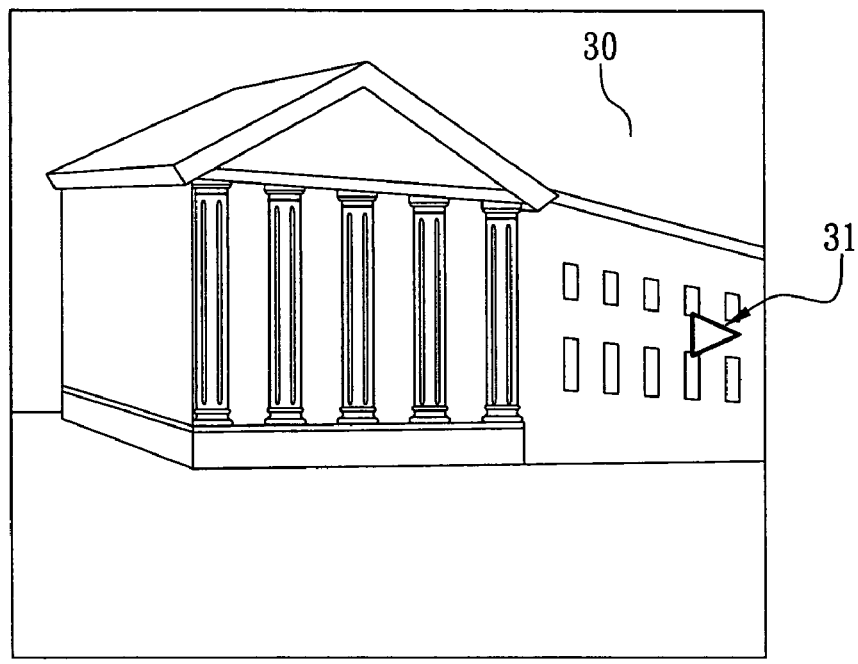
FIG. 3 is a representative diagram showing at least one four-way guiding arrow on a view finder or display screen of a photograph capturing electronic apparatus in accordance with the present invention.
Figure 4:
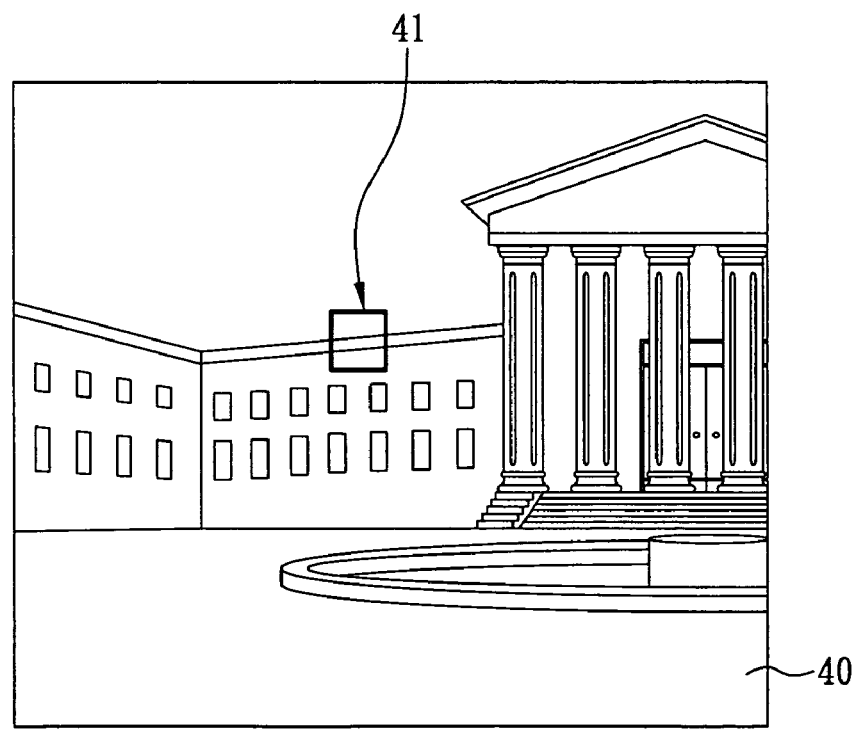
FIG. 4 is a representative diagram showing at least one indicator on a view finder or display screen of a photograph capturing electronic apparatus in accordance with the present invention.

The present invention is a method of automatic photographs stitching in a photograph capturing electronic apparatus. Refer to FIG. 3. When a user turns on a panoramic stitching mode of said electronic apparatus and captures a first photograph 30 with said electronic apparatus, said electronic apparatus displays at least one four-way guiding arrow on a viewfinder or display screen (e.g. LCD display screen). FIG. 3 shows a right-pointing arrow 31 to advise user to move said photograph capturing electronic apparatus to the right for capturing the next photograph which is suitable for stitching. If in the process of adjusting the position of said photograph capturing electronic apparatus, the user moves said electronic apparatus away from the predetermined position and direction, for example, the current preview image is determined by said electronic apparatus to have deviated to the top, bottom or right of the predetermined position of the next photograph, said electronic apparatus will display a down, up or left arrow respectively on said viewfinder or display screen to advise the user of the correct direction to move said electronic apparatus so that the suitable next consecutive photographs (e.g. the second, third, fourth photographs) can be captured. Refer to FIG. 4. When the user has moved said photograph capturing electronic apparatus to a correct position where the current preview image 40 on said viewfinder or display screen is determined by said electronic apparatus to have at a predetermined region to the right or left of said first photograph 30, an area overlapped and completely aligned to said first photograph 30 with said overlapped and aligned area reaching 20%, an indicator 41 (e.g. an indicating frame or light) is then displayed on said viewfinder or display screen for indicating that the current preview image on said viewfinder or display screen is a suitable photograph for stitching. For example, when said indicator 41 is in red color, it means the current preview image 40 displayed on said viewfinder or display screen and said first photograph 30 do not have enough overlapped and aligned area and therefore not suitable for stitching. On the other hand, when said indicator 41 turns green, it indicates that said preview image 40 is suitable to be captured as a second photograph for stitching. Following the same procedure, the user can capture a series of consecutive photographs with said photograph capturing electronic apparatus and use those photographs for stitching into a perfect panoramic photograph.

To describe the design concept and effectiveness of present invention in more details, two preferred embodiments of the present invention are provided as follows.

Figure 5:
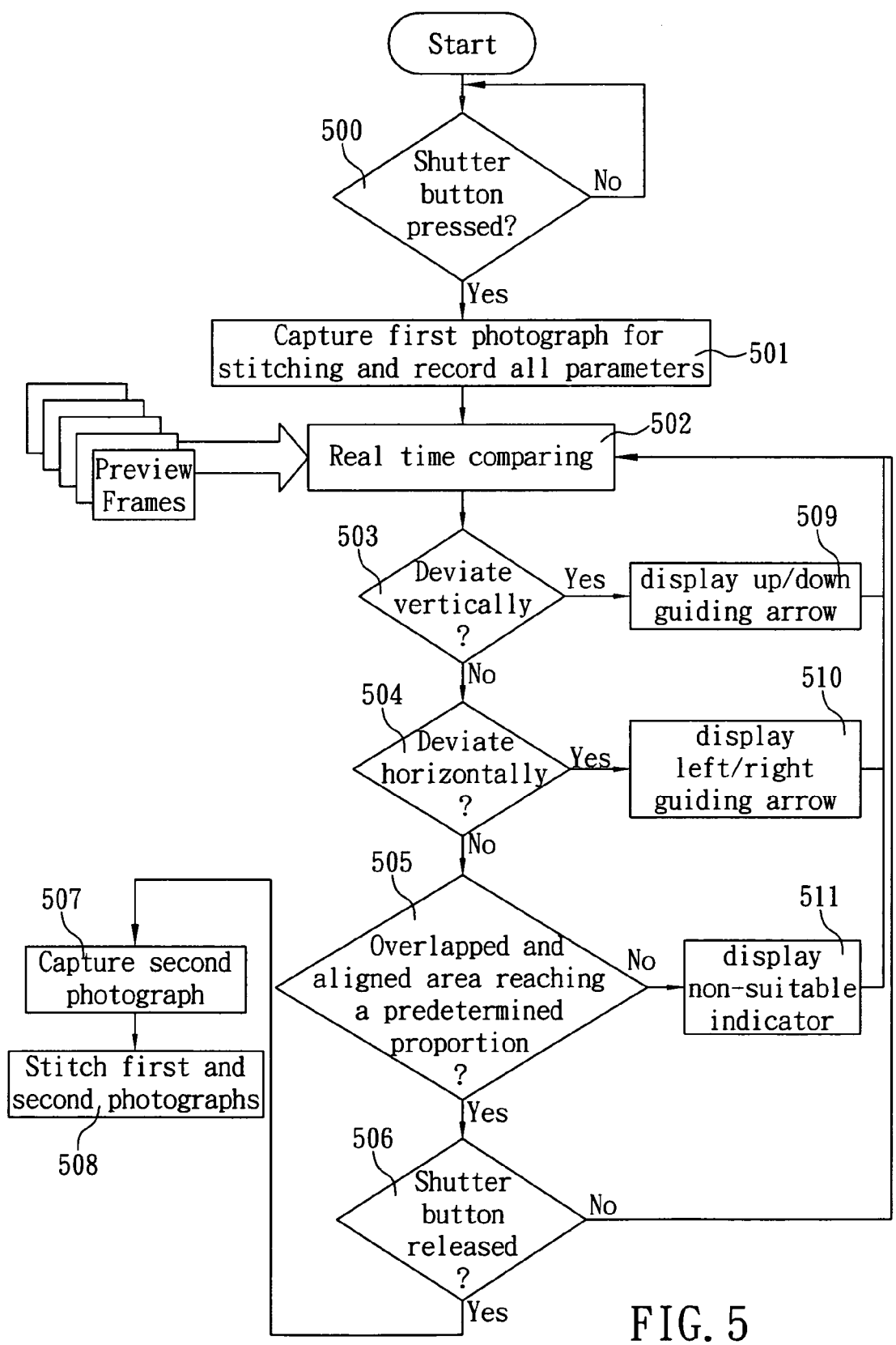
FIG. 5 is a flow chart illustrating the procedure of a first preferred embodiment in accordance with the present invention.

Refer to FIG. 5 for a first preferred embodiment of the present invention. The method in said first preferred embodiment is applied on a photograph capturing electronic apparatus, said photograph capturing electronic apparatus can be any electronic apparatus (e.g. digital cameras, digital camcorders, notebook computers and mobile phones) equipped with digital capturing devices (e.g. CCD and CMOS). When a panoramic stitching mode of said electronic apparatus is turned on by a user, said photograph capturing electronic apparatus performs the following steps to stitch two consecutively captured photographs into a panoramic photograph.

(500) determine whether a shutter button of said photograph capturing electronic apparatus has been pressed; if yes, go to step (501), else stay in step (500) and repeat said determination operation;

(501) capture a current preview image on a viewfinder or display screen of said photograph capturing electronic apparatus as a first photograph for stitching and record all parameters of said first photograph; continue to step (502);

(502) compare a current preview image on a viewfinder or display screen of said photograph capturing electronic apparatus to said first photograph; continue to step (503);

(503) determine whether the current preview image deviates vertically when compared to the predetermined vertical position of the next photograph, for example, to the top or bottom of the predetermined vertical position of the next photograph; if yes, go to step (509), otherwise continue to step (504);

(504) determine whether the current preview image deviates horizontally when compared to the predetermined horizontal position of the next photograph, for example, to the left or right of the predetermined horizontal position of the next photograph; if yes, go to step (510), otherwise continue to step (505);

(505) determine whether the current preview image has at a predetermined neighboring region 20% to the left or right of said first photograph, an area overlapped and aligned to said first photograph with said overlapped and aligned area reaching a predetermined proportion such as 50%-100%; if yes, it means the current preview image matches said first photograph enough for stitching, and said photograph capturing electronic apparatus will then display an indicator (e.g. a green indicating frame or green light) on said viewfinder or display screen for indicating that the current preview image on said viewfinder or display screen is a photograph suitable for stitching and continue to step (506); otherwise continue to step (511);

(506) determine whether said shutter button of said photograph capturing electronic apparatus has been released by user; if yes, continue to step (507); otherwise go back to step (502) to repeat said comparison operation;

(507) capture the current preview image on said viewfinder or display screen of said photograph capturing electronic apparatus as a second photograph for stitching and adjust characteristics such as color and brightness of said second photograph according to said recorded parameters of said first photograph; continue to step (508)

(508) stitch said first and second photographs captured by said photograph capturing electronic apparatus into a panoramic photograph; end the process;

(509) display an up or down guiding arrow on said viewfinder or display screen; go to step (502);

(510) display a left or right guiding arrow on said viewfinder or display screen; go to step (502); and (511) display a red indicating frame or red light on said viewfinder or display screen for indicating that the current preview image on said viewfinder or display screen does not match said first photograph enough and therefore is not a photograph suitable for stitching; go to step (502).

Figure 6:
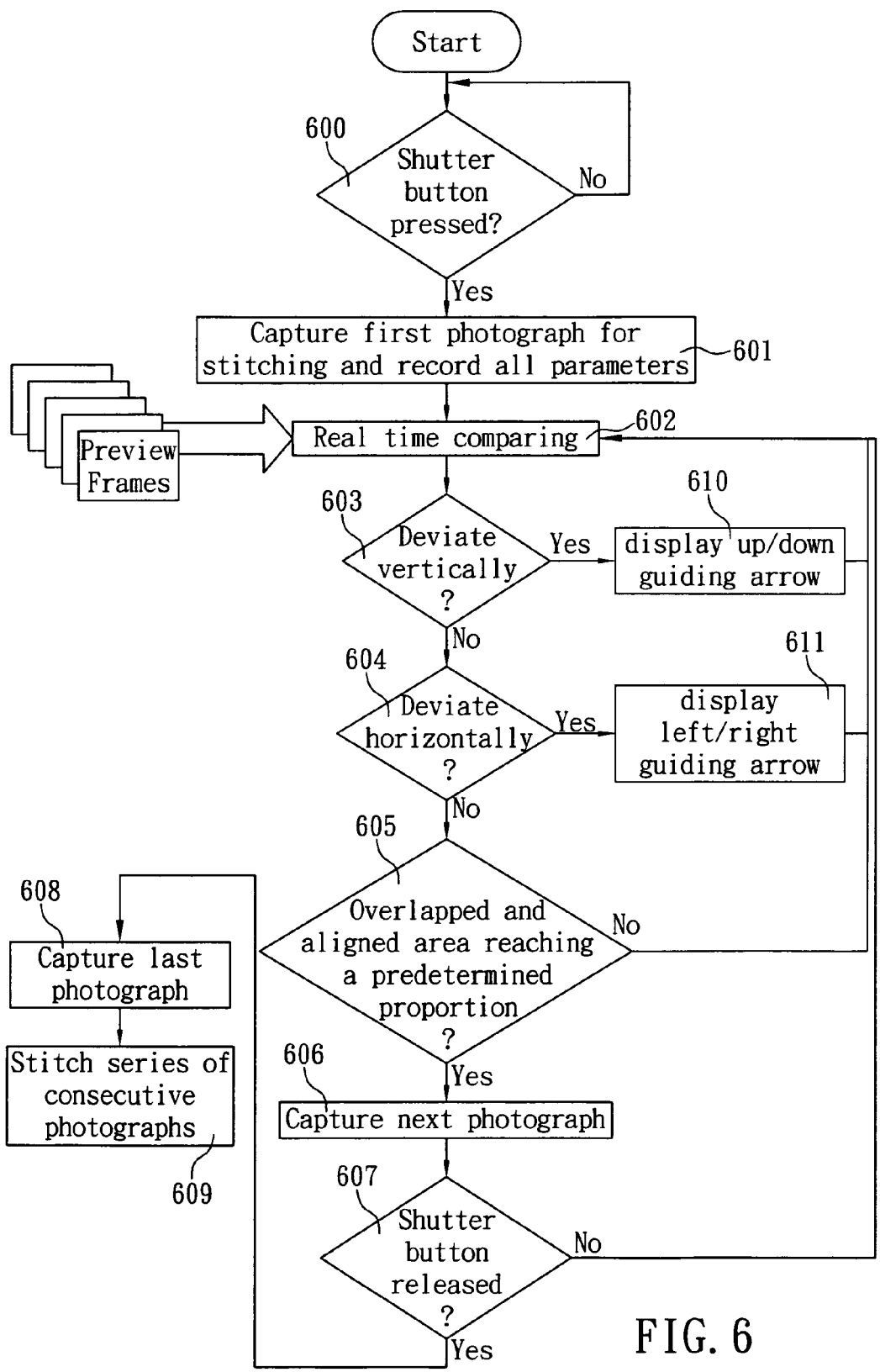
FIG. 6 is a flow chart illustrating the procedure of a second preferred embodiment in accordance with the present invention.

Refer to FIG. 6 for a second preferred embodiment of the present invention. The method in said second preferred embodiment is applied on a photograph capturing electronic apparatus. When a panoramic stitching mode of said electronic apparatus is turned on by a user, said photograph capturing electronic apparatus performs the following steps to stitch a series of consecutively captured photographs (e.g. first, second, third, fourth, fifth photographs and so on) into a panoramic photograph.

(600) determine whether a shutter button of said photograph capturing electronic apparatus has been pressed; if yes, go to step (601), else stay in step (600) and repeat said determination operation;

(601) capture a current preview image on a viewfinder or display screen of said photograph capturing electronic apparatus as a first photograph for stitching and record all parameters of said first photograph; continue to step (602);

(602) compare a current preview image on a viewfinder or display screen of said photograph capturing electronic apparatus to said first photograph; continue to step (603);

(603) determine whether the current preview image deviates vertically when compared to the predetermined vertical position of the next photograph, for example, to the top or bottom of the predetermined vertical position of the next photograph; if yes, go to step (610), otherwise continue to step (604);

(604) determine whether the current preview image deviates horizontally when compared to the predetermined horizontal position of the next photograph, for example, to the left or right of the predetermined horizontal position of the next photograph; if yes, go to step (611), otherwise continue to step (605);

(605) determine whether the current preview image has at a predetermined neighboring region 20% to the left or right of said first photograph, an area overlapped and aligned to the previously captured photograph with said overlapped and aligned area reaching a predetermined proportion such as 50%-100%; if yes, it means the current preview image matches said first previously captured photograph enough for stitching, and continue to step (606); otherwise continue to step (602);

(606) capture the current preview image on said viewfinder or display screen of said photograph capturing electronic apparatus as the next (second) photograph for stitching and adjust characteristics such as color and brightness of said second photograph according to said recorded parameters of said previously captured (first) photograph; continue to step (607)

(607) determine whether said shutter button of said photograph capturing electronic apparatus has been released by user; if yes, continue to step (608); otherwise go back to step (602) to repeat said comparison and determination operations for serially and consecutively capturing photographs such as the third, fourth and fifth photographs;

(608) capture the last photograph for stitching in said panoramic stitching mode and adjust characteristics such as color and brightness of said last photograph according to said recorded parameters of said first photograph; continue to step (609) stitch said multiple serially and consecutively photographs captured by said photograph capturing electronic apparatus into a panoramic photograph; end the process;

(610) display an up or down guiding arrow on said viewfinder or display screen; go to step (602);

(611) display a left or right guiding arrow on said viewfinder or display screen; go to step (602).

As described above, on a photograph capturing electronic apparatus implementing the method of the present invention, a user can turn on the panoramic stitching mode, utilize its continuous shot-taking feature and gradually move said photograph capturing electronic apparatus according to the direction indicated by the arrow shown on the viewfinder or display screen of said electronic apparatus to easily capture a series of consecutive photographs suitable for stitching. Then have said photograph capturing electronic apparatus automatically stitch said consecutive photographs into a prefect panoramic photograph. The method of the present invention simplifies and makes the photograph capturing procedure more user friendly, thus dramatically increases efficiency and accuracy of photographs stitching.

We have to emphasize that proportion or percentage of overlapped and aligned area stated above is only one realization of a specific embodiment and in no way limit the endless approaches of implementing the present invention. Modifications and variations of said proportion or percentage could be easily made thereto by those skilled in the art. Any method basing on the spirit of the present invention to determine whether the current preview image is suitable for stitching by comparing overlapped area in the current preview image and the previously captured photograph does not depart from the scope and spirit of the present invention and is protected under the claims of the invention set forth in the claims.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method of automatic photographs stitching in a photograph capturing electronic apparatus, wherein said photograph capturing electronic apparatus has a panoramic stitching mode for stitching multiple serially and consecutively captured photographs into a panoramic photograph, said method comprising the steps of:

determining whether a shutter button of said photograph capturing electronic apparatus has been pressed;

capturing a first preview image on a viewfinder or display screen of said photograph capturing electronic apparatus as a first photograph for stitching, and recording all parameters of said first photograph;

displaying at least one four-way guiding arrow on said viewfinder or display screen for advising user the direction to move said photograph capturing electronic apparatus for capturing a next photograph which is suitable for stitching, said next photograph having an area at a predetermined region thereof overlapped and aligned to said first photograph and reaching a predetermined proportion;

comparing a next preview image on said viewfinder or display screen with said first photograph;

determining whether said next preview image deviates vertically when compared to a predetermined vertical position of said next photograph;

determining whether said next preview image deviates horizontally when compared to a predetermined horizontal position of said next photograph;

determining whether said next preview image has an area overlapped and aligned to said predetermined region of said first photograph and reaching said predetermined proportion, if said predetermined proportion is determined to have been reached, capturing the next preview image on said viewfinder or display screen as said next photograph for stitching, and adjusting characteristics such as color and brightness of said next photograph according to said recorded parameters of said first photograph;

determining whether said shutter button of said photograph capturing electronic apparatus has been released;

capturing a last photograph for stitching in said panoramic stitching mode and adjusting characteristics such as color and brightness of said last photograph according to said recorded parameters of said first photograph; and stitching said multiple serially and consecutively photographs captured by said photograph capturing electronic apparatus into said panoramic photograph.

2. The method of claim 1, wherein when the current preview image is determined to have at a predetermined region, an area overlapped and aligned to said previously captured photograph with said overlapped and aligned area reaching a predetermined proportion, said method further comprising the step of:

displaying an indicator on said viewfinder or display screen for indicating that the current preview image on said viewfinder or display screen is a photograph suitable for stitching.

3. The method of claim 1, wherein when the current preview image is determined to have deviated vertically when compared to the predetermined vertical position of the next photograph, said method further comprising the step of:

displaying an up or down arrow on said viewfinder or display screen.

4. The method of claim 1, wherein when the current preview image is determined to have deviated horizontally when compared to the predetermined horizontal position of the next photograph, said method further comprising the step of:

displaying an left or right arrow on said viewfinder or display screen.

* * * * *